United States Patent
Parker

(10) Patent No.: US 7,088,321 B1
(45) Date of Patent: Aug. 8, 2006

(54) METHOD AND APPARATUS FOR DRIVING LED LIGHT SOURCES FOR A PROJECTION DISPLAY

(75) Inventor: Frederick S. Parker, Sherwood, OR (US)

(73) Assignee: InFocus Corporation, Wilsonville, OR (US)

(*) Notice: Subject to any disclaimer, the term of this patent is extended or adjusted under 35 U.S.C. 154(b) by 0 days.

(21) Appl. No.: 09/823,448

(22) Filed: Mar. 30, 2001

(51) Int. Cl.
*G09G 3/32* (2006.01)

(52) U.S. Cl. .............................. 345/83; 345/211; 353/31

(58) Field of Classification Search ............ 345/82–83, 345/32, 34, 84, 204, 46, 87, 102, 211; 349/5–10; 353/31, 94; 348/750–751, 272, 301, 742 348/801, 266, 268; 385/115–116, 901
See application file for complete search history.

(56) References Cited

U.S. PATENT DOCUMENTS

| | | | | |
|---|---|---|---|---|
| 3,740,570 A | * | 6/1973 | Kaelin et al. .................. 345/83 |
| 3,962,702 A | | 6/1976 | Kriege | |
| 4,298,869 A | * | 11/1981 | Okuno ......................... 345/83 |
| 4,680,579 A | | 7/1987 | Ott | |
| 4,763,975 A | * | 8/1988 | Scifres et al. .................. 385/33 |
| 4,887,074 A | * | 12/1989 | Simon et al. .................. 345/82 |
| 4,897,639 A | * | 1/1990 | Kanayama .................... 345/82 |
| 4,943,154 A | | 7/1990 | Miyatake et al. | |
| 5,022,043 A | | 6/1991 | Jacobs | |
| 5,108,172 A | * | 4/1992 | Flasck .......................... 353/31 |
| 5,278,542 A | * | 1/1994 | Smith et al. ................... 345/83 |
| 5,293,437 A | * | 3/1994 | Nixon ......................... 385/115 |
| 5,430,501 A | | 7/1995 | Nakamura | |
| 5,526,063 A | * | 6/1996 | Joubert et al. .............. 348/744 |
| 5,534,949 A | * | 7/1996 | Baron ......................... 348/742 |
| 5,552,840 A | * | 9/1996 | Ishii et al. ................... 348/751 |
| 5,651,599 A | | 7/1997 | Fujimori et al. | |
| 5,684,368 A | * | 11/1997 | Wei et al. ..................... 345/82 |
| 5,724,062 A | * | 3/1998 | Hunter ........................ 345/83 |
| 5,815,221 A | * | 9/1998 | Kojima et al. .............. 348/751 |
| 5,829,858 A | * | 11/1998 | Levis et al. ................. 353/122 |
| 5,920,297 A | | 7/1999 | Alexander | |
| 5,936,599 A | * | 8/1999 | Reymond ..................... 345/82 |
| 5,987,190 A | | 11/1999 | Takahashi et al. | |
| 6,097,367 A | * | 8/2000 | Kuriwaki et al. ............. 345/82 |
| 6,219,014 B1 | * | 4/2001 | Havel ........................... 345/82 |
| 6,249,088 B1 | * | 6/2001 | Chang .................... 315/185 R |
| 6,281,949 B1 | * | 8/2001 | Matsui et al. ............... 348/750 |
| 6,333,724 B1 | * | 12/2001 | Taira et al. ..................... 345/5 |
| 6,396,466 B1 | * | 5/2002 | Pross et al. .................... 345/82 |
| 6,480,634 B1 | * | 11/2002 | Corrigan ......................... 385/4 |

FOREIGN PATENT DOCUMENTS

| DE | 4234293 A1 | * | 4/1993 |
|---|---|---|---|
| EP | 1 006 506 A1 | | 6/2000 |

* cited by examiner

*Primary Examiner*—Dennis-Doon Chow
(74) *Attorney, Agent, or Firm*—Alleman Hall McCoy Russell & Tuttle LLP

(57) ABSTRACT

A circuit is provided to drive LEDs or diode lasers that emit light in desired wavelengths, such as the primary colors red, green, and blue, which serve as the light source for a projection display system. A display controller controls one or more series-parallel arrays of each color LED in the LED circuit with control signals to synchronize the color output of the light source with image data received from an image data source such as a personal computer. Synchronization is achieved by sending control signals to the power supply and circuit switches to sequence the color output in a single path system or adjust continuous color output in a triple path system with minimal or no reductions in the brightness of the projected image.

37 Claims, 7 Drawing Sheets

METHOD AND APPARATUS FOR DRIVING LED LIGHT SOURCES FOR A PROJECTION DISPLAY

BACKGROUND OF THE INVENTION

1. Field of the Invention

This invention relates to image projection displays and more particularly to the circuitry to drive an LED light source employed in an optical pathway of such displays.

2. Background Information

Projection systems have been used for many years to project motion pictures and still photographs onto screens for viewing. More recently, presentations using multimedia projection systems have become popular for conducting sales demonstrations, business meetings and classroom instruction. In a typical operating mode, multimedia projection systems receive analog video signals from a personal computer ("PC"). The video signals may represent still, partial, or full-motion display images of a type rendered by the PC. The analog video signals are typically converted in the projection system into digital video signals, and the signals are electronically conditioned and processed to control an image-forming device, such as a liquid crystal display ("LCD") or a digital micro-mirror device ("DMD").

A popular type of multimedia projection system employs a broad spectrum light source and optical path components upstream and downstream of the image-forming device to project the image onto a display screen. An example of a DMD-based multimedia projector is the model LP420 manufactured by In Focus Systems, Inc., of Wilsonville, Oreg., the assignee of the present application.

Significant effort has been invested into developing projectors producing bright, high-quality, color images. However, the optical performance of conventional projectors is often less than satisfactory. For example, suitable projected image brightness is difficult to achieve, especially when using compact portable color projectors in a well-lighted room. The projectors typically use high intensity arc lamps as their light source and then filter out all of the light except for blue, green, and red light, which are optically transported along three separate light paths or using some form of sequential color modulator. Because LCD displays have significant light attenuation and triple path color light paths are heavy and bulky, portable multimedia projectors typically employ DMD displays in a single light path configuration. Producing a projected color image with this configuration typically requires projecting a frame sequential image through a sequential color modulator such as a color wheel to coordinate color image data.

FIG. 1 shows a typical prior art frame sequential color (FSC) display system 10 in which a sensor 12 senses a timing mark 14 to detect a predetermined color index position of a motor 16 that rotates a color wheel 18 having respective red, green, and blue filter segments R, G, and B. A light source 20 projects a light beam 22 through color wheel 18 and a relay lens 24 onto a display device 26, such as an LCD-based light valve or a DMD. A display controller (not shown) drives display device 26 with sequential red, green, and blue image data that are timed to coincide with the propagation of light beam 22 through the respective filter segments R, G, and B of color wheel 18. A DC motor rotates color wheel 18 at about 6,650 rpm to about 7,500 rpm. Successful operation of a FSC display system depends on properly synchronizing the red, green, and blue image data to the angular position of color wheel 18.

Sensor 12 typically employs opto-electrical or electromechanical shaft position detectors or motor armature position detectors and usually requires some means for aligning timing mark 14 to the start of one of the filter segments. This alignment is typically a costly and error prone mechanical adjustment that accounts for angular differences between motor 16 and the mechanical mounting of filter segments R, G, and B. Of course, electrical or mechanical delays associated with sensor 12 further contribute to alignment errors. The accumulated angular errors open the possibility of synchronization errors between the red, green, and blue image data to the angular position of color wheel 18, a possibility that prior art projectors avoid by building a timing duty cycle into the display controller electronics.

The timing duty cycle provides for driving display device 26 with the red, green, and blue image data for only a portion of the time during which the light beam 22 is propagated through each of respective filter segments R, G, and B. This prevents presenting display device 26 with improperly colored light. For example, the timing duty cycle provides for blanking the sequential image to a DMD device in order to change the color and brightness as is required by prior art color wheel systems with fixed-sized filter segments. Unfortunately, the timing duty cycle reduces the total amount of illumination available for displaying each color which, in turn, reduces the brightness of the displayed color image. In addition, color wheels 18 and their associated motors are heavy and noisy.

An alternative technique is to use an array of light emitting devices (LEDs) as the source of light in projection display systems. The use of an LED light source substantially eliminates the mechanical, optical, and electrical rotational timing errors that are intrinsic to color wheel systems, and is described in a commonly assigned co-pending application Ser. No. 09/507,260, now issued as U.S. Pat. No. 6,224,216 on May 1, 2001, by Fred Parker et al. and entitled "System and Method Employing LED Light Sources for a Projection Display," the subject matter of which is herein incorporated by reference.

Rather than starting with a broadband light source and filtering out the undesired wavelengths, the LEDs emit desired wavelengths such as the primary colors red, green, and blue. As a result, the use of LEDs as the light source in a projection display system eliminates the need for color wheels, color wheel motors, or beam splitters. In addition, the LEDs offer a longer life, fewer thermal and environmental issues than mercury-containing high-intensity discharge (HID) lamps, better primary colors and redundancy for failed LED die, or dice.

Circuits for driving an LED array are known in the art. For example, an LED array circuit for use in retrofitting traffic signal displays with LEDs is disclosed in U.S. Pat. No. 5,936,599. However, LED array circuits in traffic signals, which display simple static images, do not address the complex sequencing and control requirements for the generation of light suitable for a projection display system. What is needed, therefore, is an LED array circuit for a projection display system that is capable of driving an LED array for displaying complex and dynamic multi-colored images.

SUMMARY

According to one aspect of the invention, a circuit is provided to drive LEDs that emit light in desired wavelengths, such as the primary colors red, green, and blue, which serve as the light source for a projection display system. The LED circuit contains one or more series-parallel arrays of each color LED, also referred to as a color channel. A display controller synchronizes the color output of each color channel with image data received from an image data source such as a personal computer. The synchronization is achieved by electronically adjusting the current path, current source and/or current level through the color channels without reducing the brightness of the light source. Redundant LEDs and/or color channels are provided to accommodate further adjustments to the current path, source and/or level to compensate for the failure of one or more LEDs or color channels.

In a single path embodiment, the light emitted from each color channel is propagated sequentially along a single optical path and mixed within an optical integrator. The display controller synchronizes the output of each color channel sequentially using control signals to maintain a single constant current source and level for all channels while adjusting the current path through the circuit to activate one or more color channels.

In a multiple-path embodiment, the light emitted from each color channel is propagated simultaneously along separate respective optical paths before being mixed within an optical integrator and combiner to form a composite image. The display controller synchronizes the output of each color channel simultaneously using separate current sources for each color channel and adjusting the current level of each source.

In accordance with other aspects of the present invention, apparatus are provided for carrying out the above and other methods.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
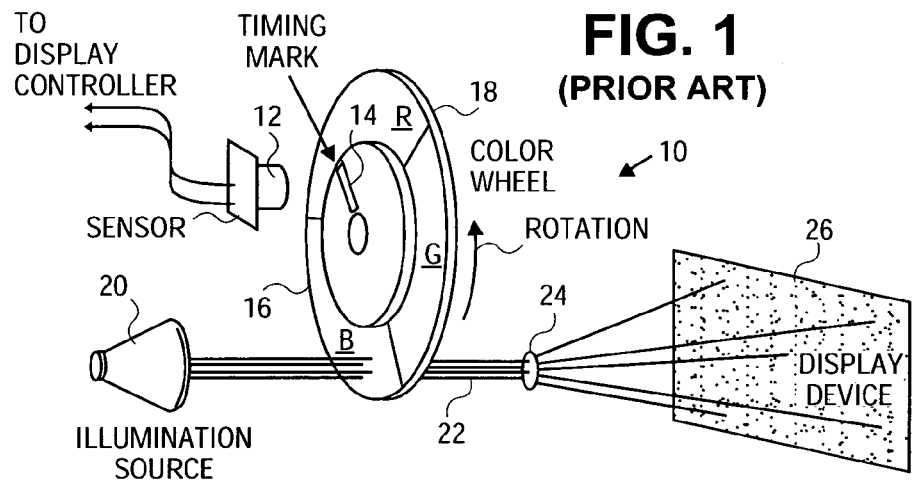
FIG. 1 is a simplified pictorial diagram showing the operating principle of a prior art FSC display device employing a color wheel having an opto-electrically sensed timing mark.
Figure 2:
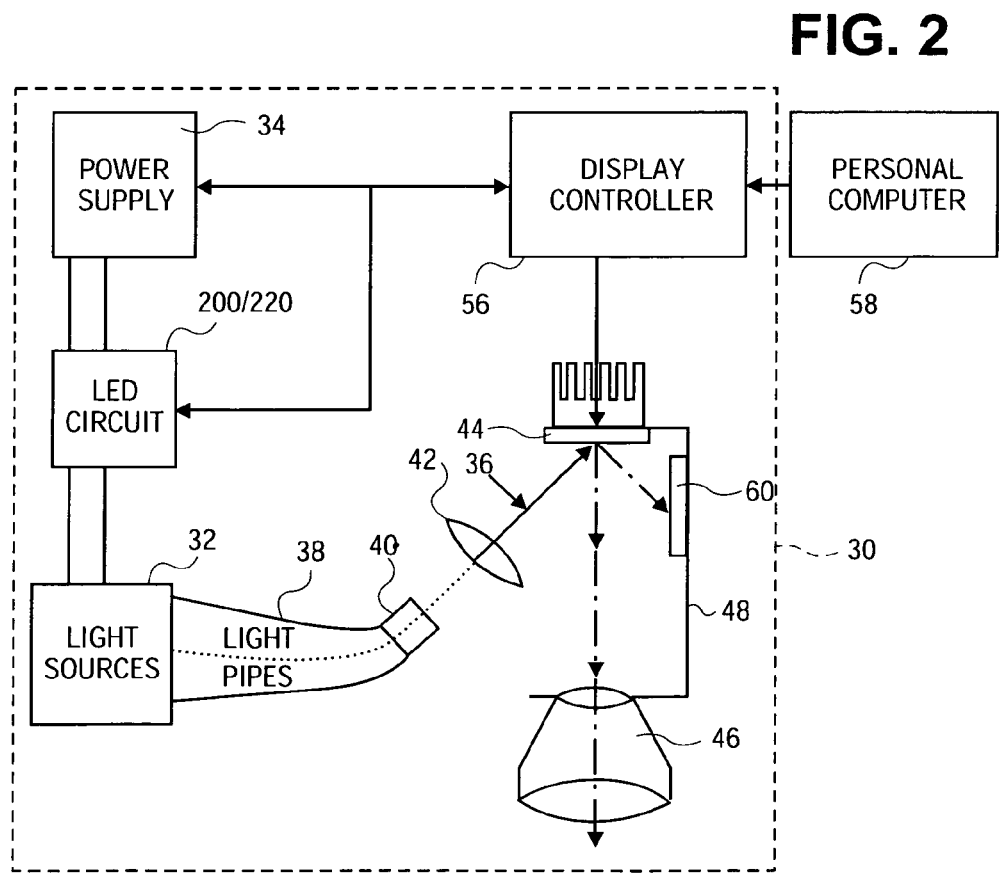
FIG. 2 is a simplified pictorial and electrical block diagram of a multimedia projector showing a light path employing an LED light source in accordance with an embodiment of the present invention.

FIG. 2 shows a single path embodiment of a multimedia projector 30 of the present invention that employs multiple, relatively monochromatic light sources 32 of two or more different wavelengths. Light sources 32 are light emitting devices (LEDs) or LED arrays and are driven by an LED circuit 200 powered by a power supply 34. The LEDs are preferably light emitting diodes or laser diodes, but can be any device capable of emitting light when driven by an LED circuit 200. Light emitted from light source 32 generally propagates along separate and common portions of an optical path 36 that may include light transmission guides 38, an optical integrator 40, one or more optical path lenses 42, a display device 44, a projection lens group 46 and various other optical components known to skilled persons.

Display device 44 is preferably a digital micro-mirror device (DMD) but may alternatively be a reflective liquid crystal on semiconductor (LCOS) array device or an LCD light valve. Projection lens group 46 preferably includes a fixed focal length lens but may also include a varifocal or zoom lens. The optical components are preferably held together by a magnesium die-cast optical frame 48 (only a portion of which is shown) within a projector housing (not shown) which is mechanically rigid and dissipates heat. Such frames and housings are well known to skilled persons and can be adapted to house a cooling fan 50 for cooling the optical components and facilitate cooling air flow. Power supply 34 can also be used to power a cooling fan (not shown in FIG. 2) and display controller 56.

Display controller 56 includes a microprocessor which is capable of receiving color image data from a multimedia device 58, such as a personal computer or a video device, and processes the image data into frame sequential red, green, and blue image data, sequential frames of which are conveyed to display device 44 in proper synchronism with control signals sent to LED circuit 200 or power supply 34 to activate and control the light sources 32 that emit the corresponding color.

Where display device 44 is a DMD, display controller 56 controls a high-density array of digitally deflected mirrors in display device 44 such that light propagating from lens 42 is selectively reflected by each mirror in the array either toward projection lens 46 or toward a light-absorbing surface 60 mounted on or near optical frame 48. The light reflecting off mirrors of display device 44 oriented in the ON direction propagates through projection lens 46 for display on a screen (not shown), and the light reflecting off mirrors of display device 44 oriented in the OFF direction is absorbed by light-absorbing surface 60.

DMD 44 is preferably a Texas Instruments Model DMD 1076 spatial light modulator composed of a rectangular array of aluminum micro mechanical mirrors, each of which can be individually deflected at an angle of, for example, ±10 degrees or more about a hinged diagonal axis. The deflection angle (either positive or negative) of the mirrors is individually, controlled by changing the memory contents of underlying addressing circuitry and mirror reset signals.

If display device 44 is, for example, a transmissive LCD, the optical path 36 could propagate through it and straight through projection lens 46 without any bends. Where display device 44 is a transmissive LCD, the light from light transmission guides 38 is first polarized by a polarizer that may form part of LCD 44 to create light having a selected pass orientation. The polarized light is then modulated by an informational pattern of pixels in LCD 44. The fully inactive pixels rotate the polarized light by 90°, and the fully active pixels pass the polarized light without rotation. The modulated light then passes through a front polarizer (or analyzer) that blocks the rotated light of the fully activated pixels and passes the nonrotated light of the fully inactive pixels. The modulated light, particularly the light passing through the inactive pixels, is directed through projection lens 46 for viewing.

Skilled persons will appreciate that a variety of LCD panels are commercially available and some employ different polarization schemes that could be employed in the present invention. For FIG. 2, LCDs 44 would be reflective LCDs and for FIG. 9 LCDs 44 would be transmissive LCDs such as XGA-resolution LCDs manufactured by Sony Electronic, Inc., under model number LCX017AL.

Figure 3:
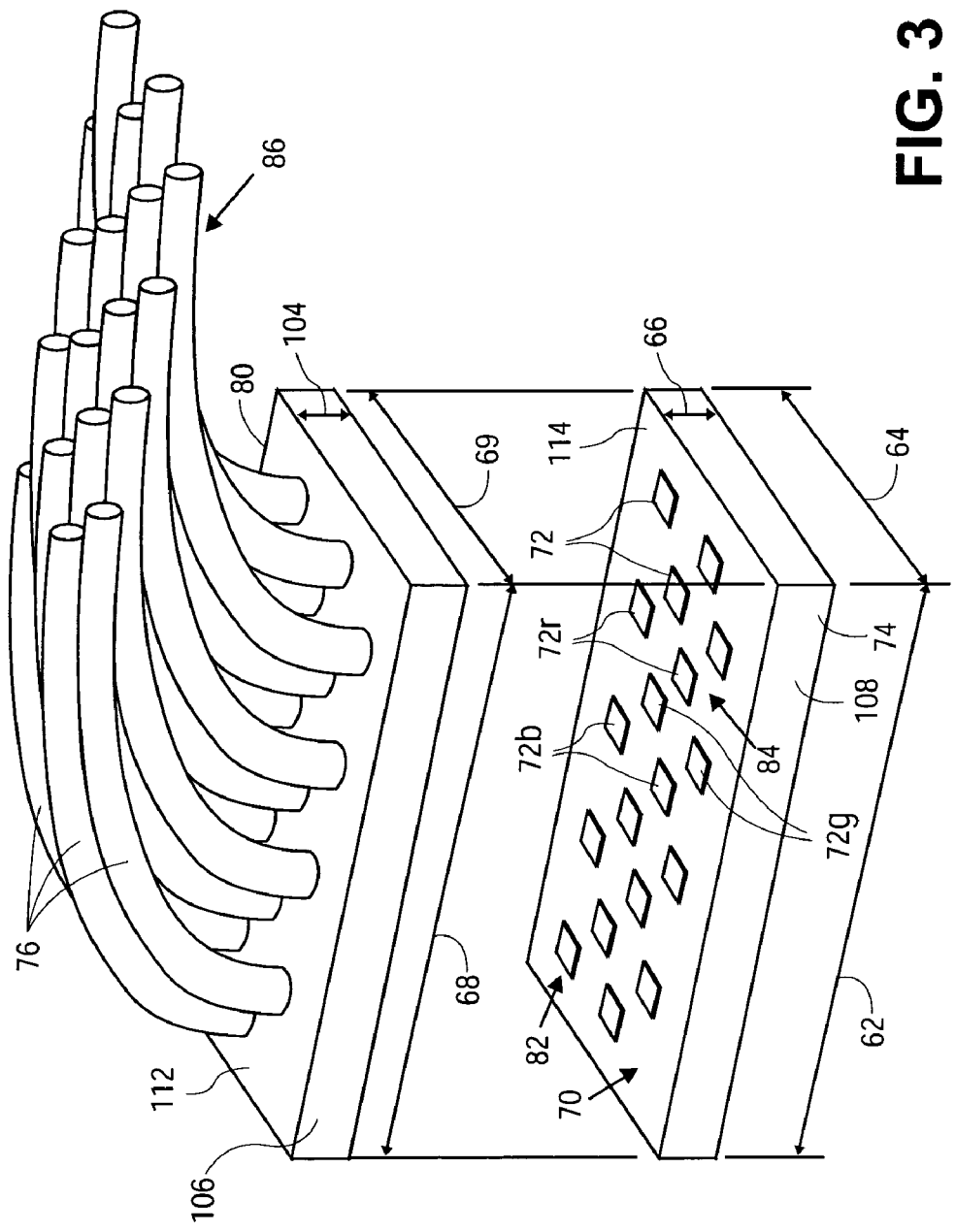
FIG. 3 is a partly exploded orthographic projection of an LED array light source optically connected to optical fibers through a cover plate in accordance with an embodiment of the invention.

FIG. 3 presents an embodiment in which light sources 32 comprise multiple LED arrays 70 of multiple LEDs 72 on a substrate 74 and light transmission guides 38 include optical fibers 76. Light sources 32 may also comprise arrays of multiple laser diodes as the multiple LED arrays 70 without departing from the principles of the invention. Ends of optical fibers 76 extend through, and are held in place by, holes in a cover plate 80 and are mated to LEDs 72 in a one-to-one relationship. In this embodiment, the LEDs 72 and holes are aligned in rows 82 and columns 84.

In one embodiment, light sources 32 include multiple LED arrays 70 which, when supplied with about 200 Watts, each emit light in one of the three additive primary wavelengths: red, green, and blue, at an efficiency of about 30%–50%. For example, the blue LEDs 72b can be HPWL series, manufactured by Hewlett Packard (HP), that emit 4.1 lumens per Watt in a wavelength range of 455–485 nm. Similarly, the green LEDs 72g can be HPWL series, also manufactured by HP, that emit 11.6 lumens per Watt in a wavelength range of 515–545 nm; the red LEDs 72r can be HPWL series, also manufactured by HP, that emit 11 lumens per Watt in a wavelength range of 610–650 µm. Skilled persons will appreciate that as better LEDs having increased efficiency are developed and perfected, brighter LEDs would be preferred. LEDs 72 can be spaced apart as desired to facilitate dissipation of heat. Skilled persons will also appreciate that LED array 70 may comprise a side emitting bar of laser diodes.

Other LED emission wavelengths, such as yellow, cyan, or white can be additionally or alternatively employed. Although magenta LEDs do not currently exist, magenta can be made from a combination of red and blue LEDs 72r and 72b. For convenience, white can be considered to be a single color or a combination of colors. In one embodiment, LED array 70 is attached to 18 optical fibers 76 that are collected into one or more optical bundles 86 that may have a cumulative output area of less than 56 mm². Thus, LED array 70 has a greater area of substrate surface 114 that the output area of its respective optical fiber bundle 86 so the light exiting the bundle output area has greater intensity (and less heat) than the light emitted from surface 114 of the LED array 70. Skilled persons will also appreciate that a single LED array 70 can contain LEDs that all emit the same wavelength or can have rows 82, columns 84, or groupings of different wavelength LEDs 72b, 72g, and/or 72r as demonstrated in FIG. 3. Skilled persons will further appreciate that emission intensity, heat dissipation characteristics, and manufacturing cost may also play a role in determining the spacing and size of LEDs 72 and/or the size and number of LED arrays 70 that are employed.

Figure 4:
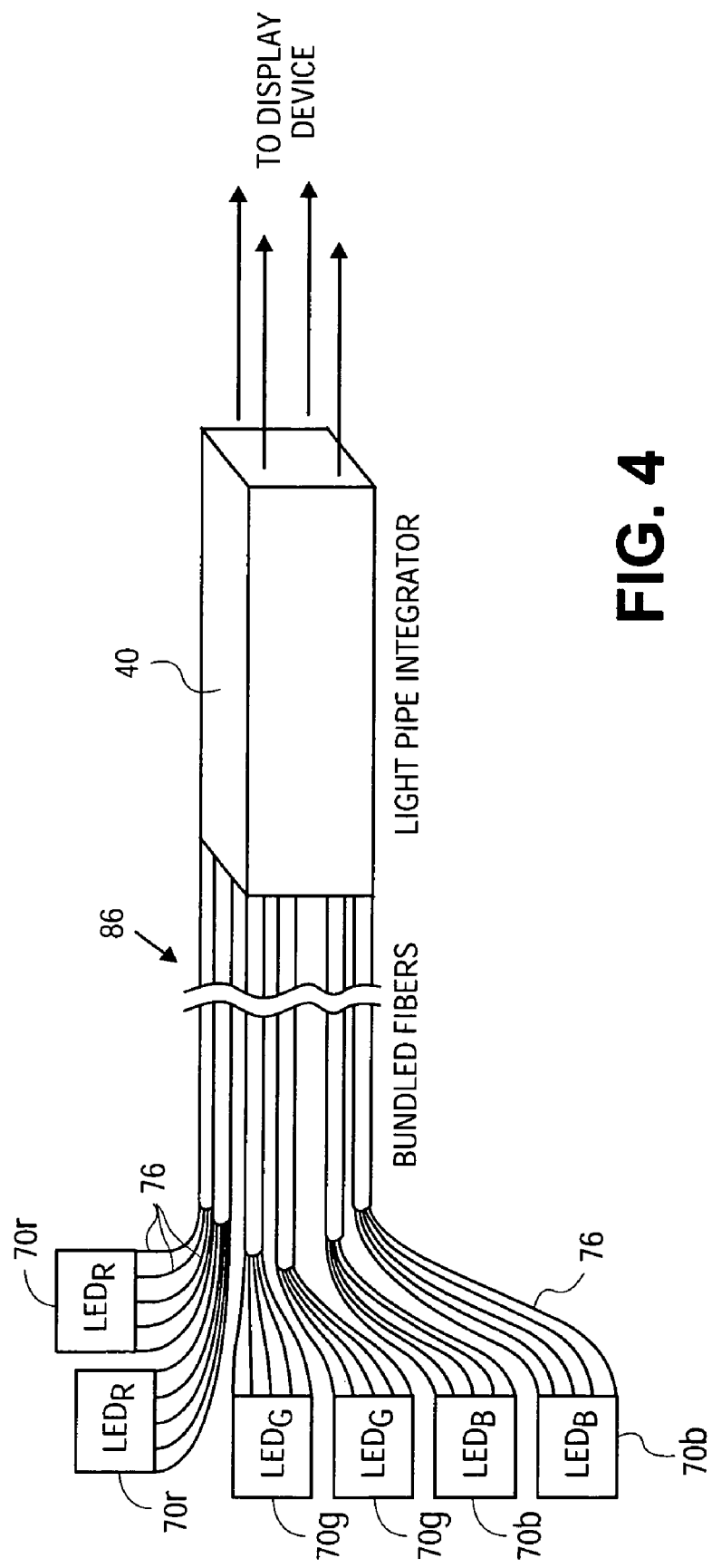
FIG. 4 is a partly schematic side elevation view of an embodiment employing multiple LED arrays of different emission wavelengths optically connected to a universal light pipe integrator through multiple respective fiber bundles.

FIG. 4 shows one embodiment of a single path projector 30 employing single color LED arrays 70r, 70g, and 70b having respective red, green, and blue emission wavelengths. Optical fibers 76 from each similarly colored LED 72, LED array 70, or group of LED arrays 70 can be bundled into a common fiber bundle 86, which can be subsequently coupled into an optical integrator 40. With reference again to FIGS. 2 and 4, where different colored light is integrated into a common optical integrator prior to propagating to or through a display device 44 in a single path system, display controller 56 generates control signals to LED circuit 200/220 and power supply 34 (as explained in more detail in FIGS. 5 and 6) to synchronize turning ON and OFF the groups of similarly colored LEDs 72 with the color image data from personal computer 58 in a frame sequential manner. An LED-lighted single path projector 30 provides a light-weight, simple, bright, and inexpensive multimedia projection system. As discussed above with reference to FIG. 3, a variety of LED color options can be employed. In addition, white light from additional LED arrays or other white sources such as HID or arc lamps can be employed in a separate color time frame or selectively added to frames employing other colors. Alternatively or in addition, LED arrays 70r, 70g, and 70b can be employed simultaneously to create a white color time frame.

Iin one embodiment, the output ends of approximately 200 or more fiber bundles 86 are coupled to the input end of optical integrator 40. If photometrically weighted intensity (white balanced at optimum luminance) of the blue, green, and red LED arrays 70 described above are desired, then approximately 45 blue LEDs 72, 105 green LEDs 72, and 50 red LEDs 72 would be employed to produce 2000 lumens of white light. Skilled persons will appreciate that white balancing can be accomplished or fine tuned by modulating the amount of time for which each different color LED array 70 is activated.

Figure 5:
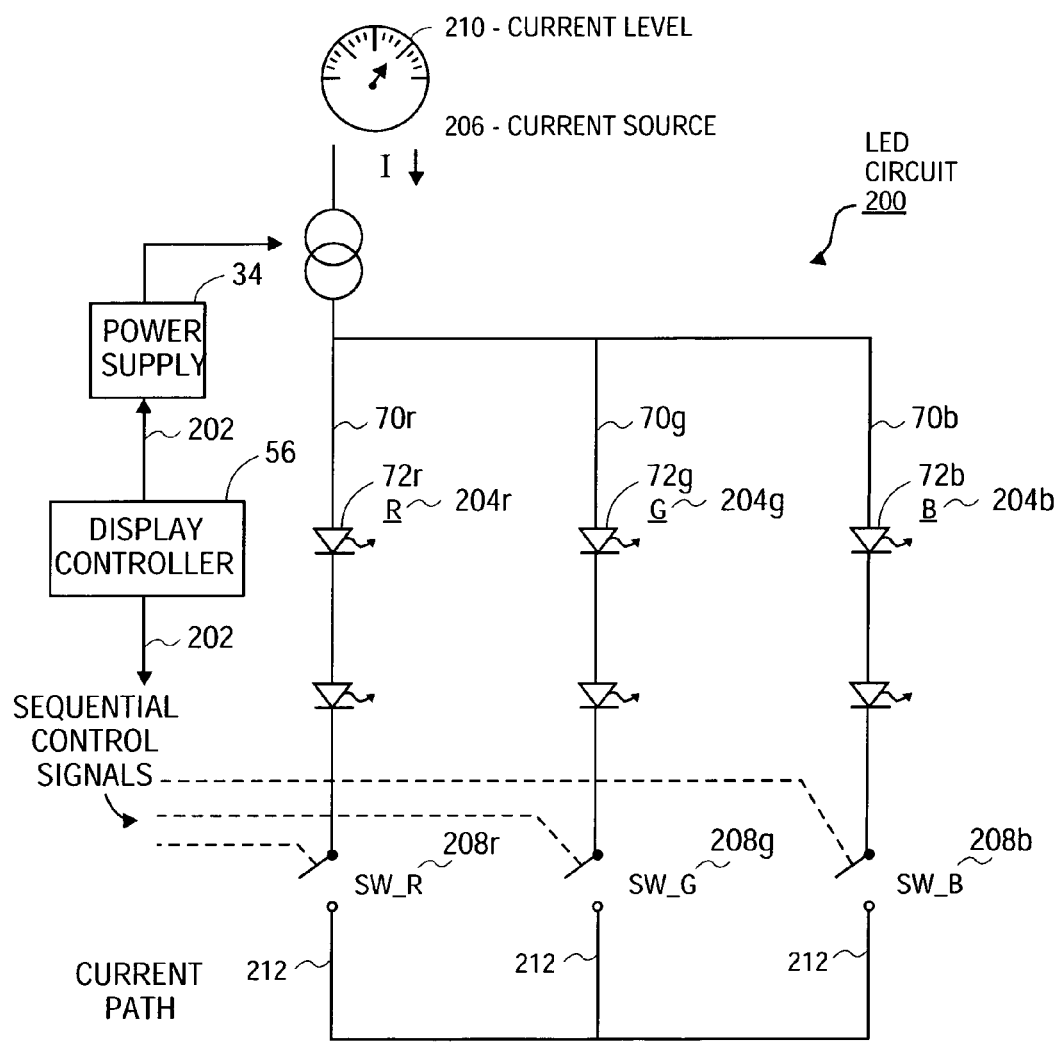
FIG. 5 is a simplified electrical block diagram of an LED circuit used to drive the LED arrays shown in FIG. 4, in accordance with an embodiment of the invention.

FIG. 5. illustrates one embodiment of an LED circuit 200 used to drive LED arrays 70r, 70g, and 70b in the single path embodiment shown in FIG. 4. As shown, LED circuit 200 contains LEDs 72 where each similarly colored LEDs 72r, 72g, and 72b are arranged in series to form color channels 204r, 204g, and 204b for each color. Display controller 56 generates control signals 202 in a sequence that corresponds to the sequence of the frame sequential color image data from personal computer 58 to control power supply 34, which powers the current source 206 to LED circuit 200. The control signals 202 operate to cause the power supply 34 to turn the power to current source 2060N or OFF. When the power to the current source 206 is OFF, the LEDs are turned OFF (i.e. do not emit light), and when the power to the current source 206 is ON, the LEDs are turned ON (i.e. emit light). The control signals can also operate to cause the power supply 34 to adjust the power to current source 206 to change the current level 210. Higher current levels 210 cause the LEDs to emit brighter light and lower current levels cause the LEDs to emit dimmer light.

Alternatively or in addition, display controller 56 generates control signals 202, also in a sequence that corresponds to the sequence of the frame sequential color image data from personal computer 58, to control switches SW_R 208r, SW_G 208g, and SW_B 208b. When the switches 208 are in the OPEN position the current path 212 is interrupted, and corresponding color channels 204 and LEDs 72 are turned OFF (i.e. do not emit light), and when switches 208 are in the CLOSED position the current path 212 is resumed, and corresponding color channels 204 and LEDs 72 are turned ON (i.e. emit light).

Unlike the prior art color wheel display systems having fixed-size color segments, LED circuit 200 allows full brightness of the light source 32 because it is unnecessary to blank the sequential image on the display device 44 to change the color or the color's brightness. As a result, the display controller 56 can maintain a constant current source 206 and constant light emission to provide the display device 44 with a full-time duty cycle. Moreover, instead of relying on fixed voltages and resistors to drop the voltage for the different color LEDs, which is an inefficient use of power, LED circuit 200 provides for lower power consumption by allowing for the fact that the different color LEDs 72 have different voltage drops. Specifically, the display controller 56 generates control signals 202 to power supply 34 and switches 208 to adjust the current level 210 in coordination with the current path 212 through the color channels 204 to accommodate the different voltage requirements of the different color LEDs 72.

Figure 6:
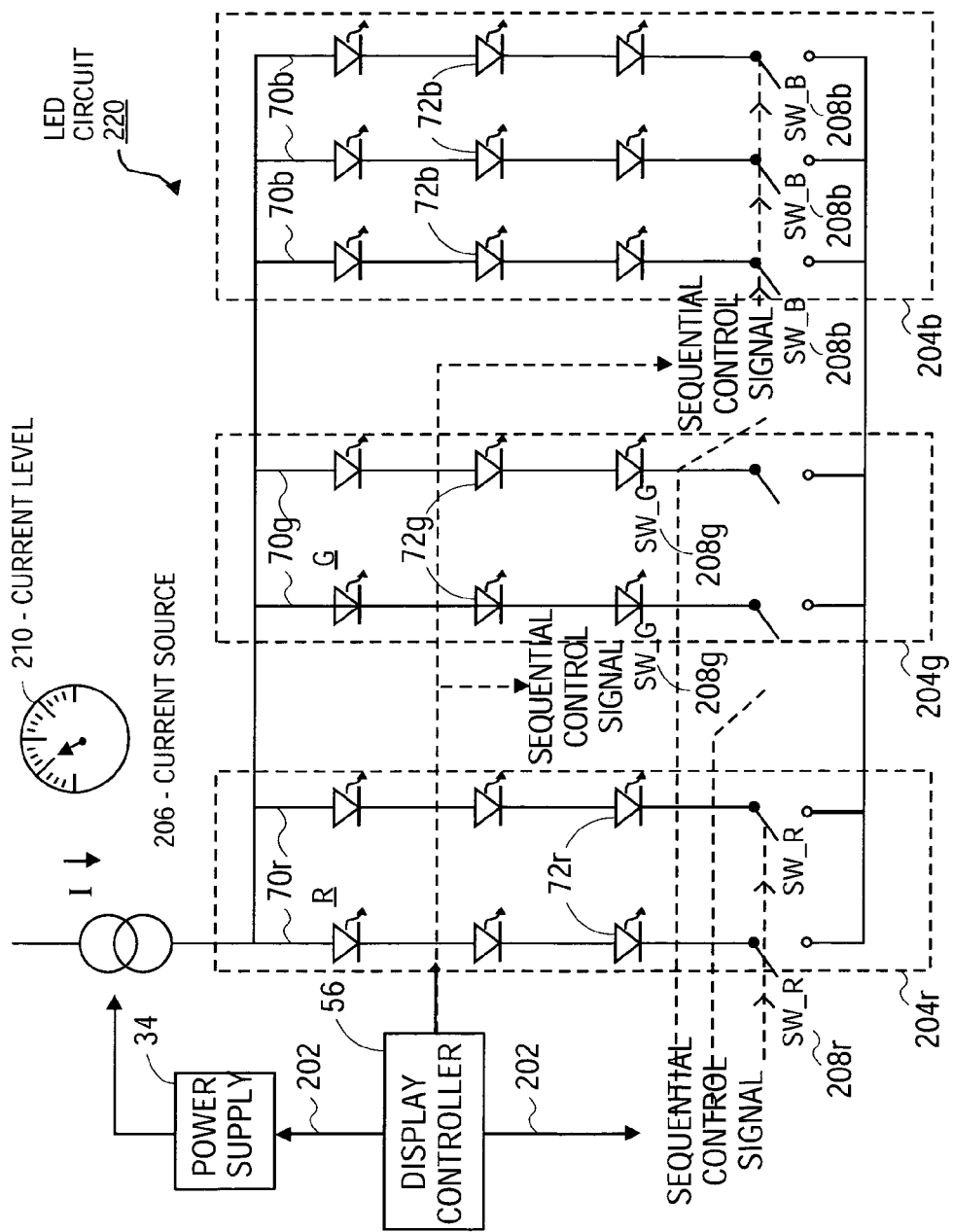
FIG. 6 is a simplified electrical block diagram of another LED circuit used to drive the LED arrays shown in FIG. 4, in accordance with an embodiment of the invention.

FIG. 6 illustrates an alternative embodiment of an LED circuit 220 used to drive LED arrays 70r, 70g, and 70b in the single path embodiment shown in FIG. 4. Similarly to LED circuit 200 in FIG. 5, LED circuit 220 in FIG. 6 contains LEDs 72 where each similarly colored LEDs 72r, 72g, and 72b are arranged in various combinations of series parallel arrays to form color channels 204r, 204g, and 204b for each color. Display controller generates control signals 202 to the power supply 34 and to the switches 208 in a manner similar to LED circuit 200 in FIG. 5. The display controller 56 can then match the light output of each color channel with a constant current source 206 to adjust the final mixed white-point color emitted by light source 32. The display controller 56 matches the light output of each color channel by generating control signals 202 to switches 208 to alter the current path 212, thereby altering the number of LEDs 72 activated or de-activated (i.e. turned ON or OFF) for a given color.

In one embodiment the combination of series-parallel arrays of each color LED provides redundancy so that when one or more LEDs 72 or channels 204 of a given color fail, other LEDs or channels are still available. The display controller 56 adjusts the duty cycle of each of the color channels 204 to re-balance the color emitted by the light source 32 by generating appropriate control signals 202 to power supply 34 and switches 208.

Figure 7:
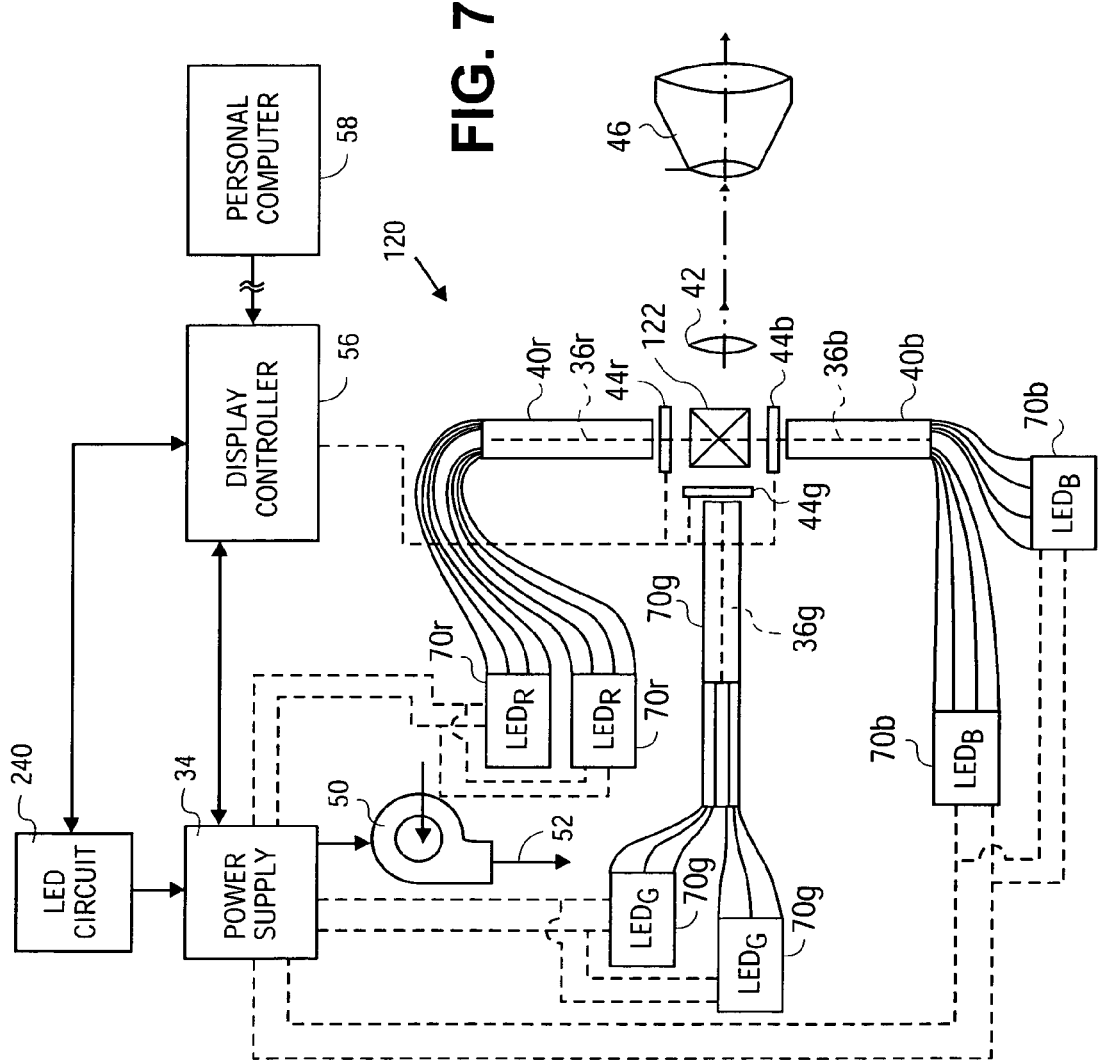
FIG. 7 is a partly schematic side elevation or plan view of an embodiment employing multiple LED arrays of different emission wavelengths optically connected to separate light pipe integrators through multiple-respective fiber bundles.

FIG. 7 shows an embodiment of a triple path projector 120 employing single color LED arrays 70r, 70g, and 70b that emit light that propagates along separated respective optical paths 36r, 36g, and 36b, including propagating through respective fiber bundles 86r, 86g, and 86b to respective separate light pipe integrators 40 and through respective display devices 44r, 44g, and 44b, which are preferably LCDs. Optical paths 36r, 36g, and 36b meet at an optical combiner 122, which emits a composite image to lenses 42 and 46. Display controller 56 generates control signals to LED circuit 240 and power 34 to synchronize the continuous light output of groups of similarly colored LEDs 72 with the color image data from personal computer 58 (as explained in more detail in FIG. 8). As in the single-path embodiment, a variety of LED color options can be employed. In addition, white light from additional LED arrays or other white sources such as HID or arc lamps can be input, for example, into a fourth side of combiner 122 to enhance brightness and could be employed with or without a display device 44.

Figure 8:
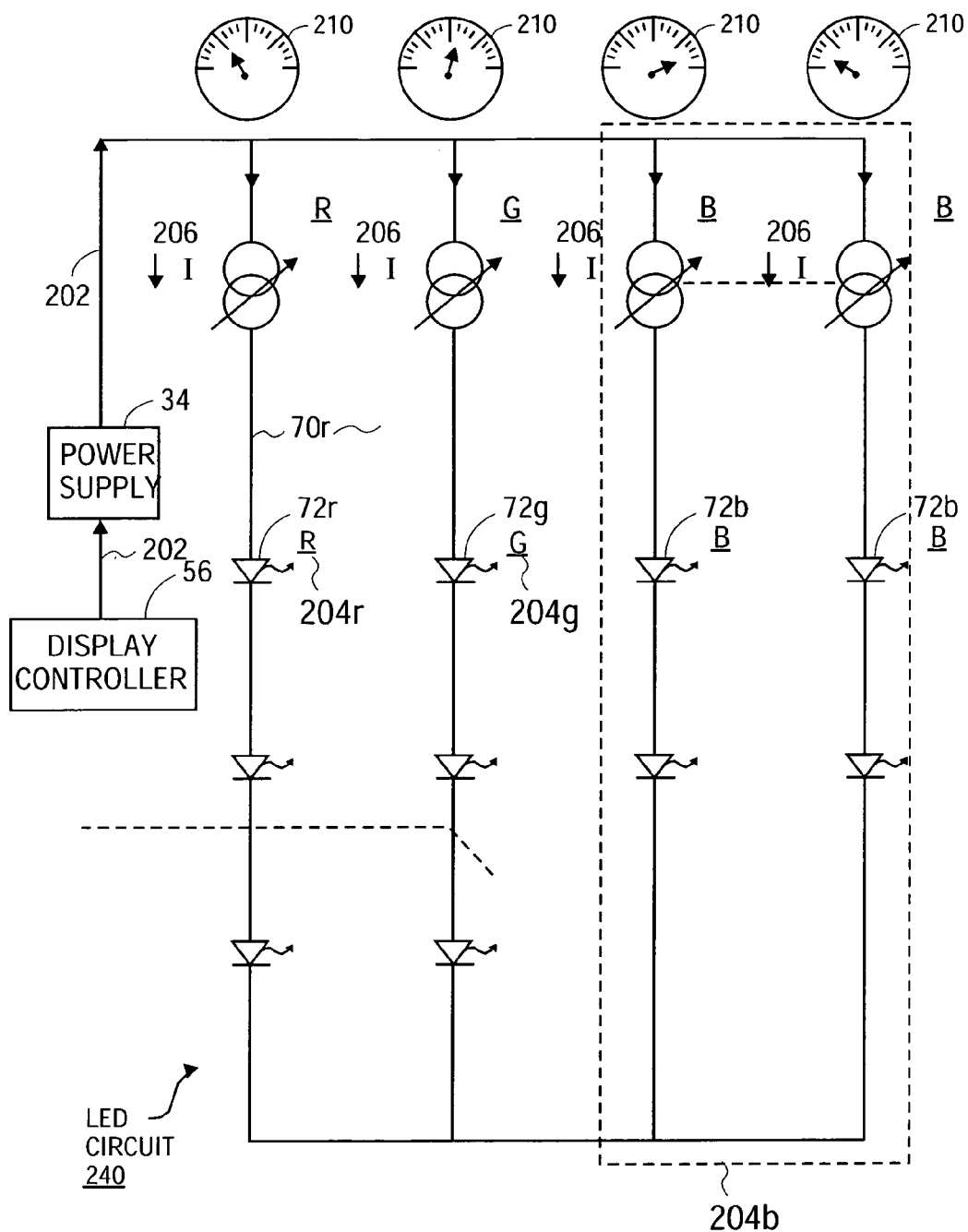
FIG. 8 is a simplified electrical block diagram of one embodiment of an LED circuit used to drive the LED arrays shown in FIG. 7.

FIG. 8 illustrates an alternative embodiment of an LED circuit 240 used to drive LED arrays 70r, 70g, and 70b in the triple path embodiment shown in FIG. 7. Similarly to LED circuits 200 and 220 in FIGS. 5–6, LED circuit 240 in FIG. 8 contains LEDs 72 where, for example, similarly colored LEDs 72r and 72g are arranged in series to form color channels 204r and 204g, and similarly colored LEDs 72b are arranged in a series parallel array to form color channel 204b. Various combinations of series and series parallel arrays of LEDs 72 other than those illustrated in FIG. 8 may be used to form color channels 204 without departing from the principles or exceeding the scope of the invention.

One advantage of the triple path embodiment illustrated in FIGS. 7–8 is that LED arrays 70r, 70g, and 70b can be left on continuously and do not require color frame synchronization. Instead, using control signals 202 to control the power supply 34 and current level 210 of each separate current source 206 in LED circuit 240, display controller 56 synchronizes the continuous light output provided to display devices 44r, 44g, and 44b. The display devices 44r, 44g, and 44b are properly oriented with respect to each other and combiner 122 to generate the composite image. Such an image could be about 50% brighter than in a single path embodiment where each color is projected only ⅓ of the time for each image frame.

In one embodiment, each LED array 70 is driven from a separate current source 206 and current level 210 as controlled by display controller 56 through power supply 34. Display controller 56 generates control signals 202 to the power supply 34 in a manner similar to LED circuits 200 and 220 in FIGS. 5–6. However, instead of adjusting the color output of each color channel 204 sequentially (i.e. turning ON and OFF the groups of similarly colored LEDs) LED circuit 240 is provided with a display controller 56 that can simultaneously adjust the current level 210 of each individual LED array's separate current source 206 to achieve the desired continuous color output from each color channel 204. Thus, the control signals 202 to the power supply 34 operate to adjust the brightness or intensity of the continuous color output and not just to turn the colors ON or OFF.

Another advantage of the triple path embodiment illustrated in FIGS. 7–8 is that different types of LCDs could be employed to modulate the different color frames because some LCDs are more transmissive to some of the colors or provide better color output than other LCDs. Not having to limit selection to a single LCD that performs moderately well for all three colors would be very advantageous. Similarly to LED circuit 220 of FIG. 6, LED circuit 240 may also be provided with various combinations of redundant LEDs 72 and LED arrays 70 to improve reliability.

The current sources used in the embodiments of LED circuits 200, 220, and 240 can be either simple pass elements such as a field-effect transistor (FET) operated in a linear mode, or a switching regulator design such as is found in an HID ballast with current control. These types of current sources are well-known to those skilled in the art and thus will not be discussed further except as they pertain to the present invention.

Skilled workers will recognize that portions of this invention may be implemented differently than the implementations described above, for preferred embodiments. For example, skilled persons will appreciate that numerous variations of the LED 72, LED array 70, optical fiber 76, fiber bundle 86, reflector 100, condenser 102, and integrator 40 coupling schemes described herein can be employed with either the single path or triple path projection systems of the present invention. In particular, it should be understood that there are a very large number of combinations of LEDs 72 and series parallel arrays of LEDs 70 that may be employed in LED circuits 200, 220, and 240 to form color channels 204 without departing from the principles of or exceeding the scope of the present invention. It should be further understood that either light emitting diodes or laser diodes may be combined in a similar fashion and employed as the LEDs also without departing from the principles of or exceeding the scope of the present invention.

In addition, this invention is suitable for use with many differently folding optical paths, separate wavelength light sources, and alternative display devices, display controllers, and FSC data formats. Accordingly, it will be appreciated that this invention is also applicable to color synchronization applications other than those found in multimedia projectors. The scope of the present invention should, therefore, be determined only by the following claims.

What is claimed is:

1. In a color sequential projection system, an apparatus comprising:
   a first set of light emitting devices (LEDs) to generate light having a first wavelength during a first emission time period;
   a second set of LEDs to generate light having a second wavelength during a second emission time period, the second wavelength being different from the first wavelength;
   a power supply providing a shared current source to the first and second set of LEDs;
   a first switch arranged in series with the first set of LEDs;
   a second switch arranged in series with the second set of LEDs;
   a display controller coupled to the power supply and the first and the second switches, the display controller to generate a first and second control signal respectively in accordance with a first and second color frame data, the first control signal to operate on at least the power supply or the first switch to enable the first set of LEDs during the first emission time period, and the second control signal to operate on at least the power supply or the second switch to enable the second set of LEDs during the second emission time period, wherein the light having the first wavelength and the light having the second wavelength is balanced, at least in part, by adjusting durations of the first emission time period and the second emission time period; and
   first and second light transmission guides to route light from the first and second sets of LEDs to first and second display devices.

2. The apparatus of claim 1, further comprising:
   a third set of LEDs to generate light having a third wavelength during a third emission time period, the third wavelength being different from the first and second wavelengths;
   a third switch coupled to the third set of LEDs, wherein the power supply provides the shared current source to the third set of LEDs; and
   a third light transmission guide to route light from the third set of LEDs to a third display device;
   wherein the display controller is further to generate a third control signal in accordance with a third color frame data, the third control signal operating on at least the power supply or the third switch to enable the third set of LEDs during the third emission time period, wherein the light having the first wavelength and/or the light having the second wavelength and the light having the third wavelength is balanced, at least in part, by adjusting the durations of the first emission time period, the second emission time period and the third emission time period.

3. The apparatus of claim 2 wherein the first, second, and third sets of LEDs emit red, green, and blue light, respectively.

4. The apparatus of claim 2 wherein the first, second, and third sets of LEDs emit yellow, cyan, and magenta light, respectively.

5. The apparatus of claim 2 wherein the first, second, and third sets of LEDs are light emitting diodes.

6. The apparatus of claim 2 wherein the first, second, and third sets of LEDs are laser diodes.

7. The apparatus of claim 2-wherein the display controller generates a compensating control signal to operate on at least one of the first, second, and third switches to compensate for a failed LED in the first, second, and third sets of LEDs, respectively.

8. The apparatus of claim 2, wherein the first, second, and third control signals further operate on a current level of a current source to adjust the brightness of the light emitted by the first, second, and third sets of LEDs, respectively.

9. The apparatus of claim 2, wherein at least one of the first, second, and third sets of LEDs further comprises of at least one set of series-parallel arrays of LEDs.

10. The apparatus of claim 2 wherein the first light transmission guide comprises a first plurality of optical fibers optically coupled with one or more of the LEDs from the first set of LEDs and a light pipe integrator coupled with the first plurality of optical fibers, and wherein the second light transmission guide comprises a second plurality of optical fibers optically coupled with one or more of the LEDs from the second set of LEDs and a light pipe integrator coupled with the second plurality of optical fibers, and further wherein the third light transmission guide comprises a third plurality of optical fibers optically coupled with one or more of the LEDs from the third set of LEDs and a light pipe integrator coupled with the third plurality of optical fibers.

11. The apparatus of claim 10 further comprising a first display device to receive light from the first set of LEDs through the first transmission guide, a second display device to receive light from the second set of LEDs through the second transmission guide and a third display device to receive light from the third set of LEDs through the third transmission guide.

12. The apparatus of claim 11 wherein the first, second and third display devices comprises one or more of: a micromirror device, a transmissive liquid crystal display, and a reflective liquid crystal display.

13. The apparatus of claim 12 further comprising an optical combiner to receive light from the first, second and third display devices.

14. The apparatus of clam 13 further comprising a projection lens to project an Image provided by the optical combiner.

15. In a color sequential projection system, a circuit comprising:
   a means for generating light having a first wavelength during a first emission time period from a first set of light emitting devices (LEDs);
   a means for generating light having a second wavelength during a second emission time period from a second set of LEDs, the second wavelength being different from the first wavelength;
   a means for providing a shared current source to the first and second set of LEDs from a power supply;

a means for arranging a first switch in series with the first set of LEDs;

a means for arranging a second switch in series with the second set of LEDs;

a means for coupling a display controller to the power supply and the first and second switches, the display controller adapted to having a means for generating a first and second control signal respectively in accordance with a first and second color frame sequential data, the first control signal operating on at least the power supply or the first switch to drive the first set of LEDs during the first emission time period, and the second control signal operating on at least the power supply or the second switch to drive the second set of LEDs during the second emission time period, wherein the light having the first wavelength and the light having the second wavelength is balanced, at least in part, by adjusting durations of the first emission time period and the second emission time period; and means for routing the light from the first and second sets of LEDs to first and second display devices.

16. The circuit of claim 15, further comprising:

a means for generating light having a third wavelength during a third emission time period from a third set of LEDs, the third wavelength being different from the first and second wavelengths;

a means for coupling a third switch to the third set of LEDs;

a means for providing the shared current source to the third set of LEDs from the power supply; and means for routing the light from the third set of LEDs to a third display device;

wherein the display controller is further adapted to generate a third control signal in accordance with a third color frame sequential data, the third control signal operating on at least the power supply or the third switch to drive the third set of LEDs during the third emission time period, wherein the light having the first wavelength and/or the light having the second wavelength and the light having the third wavelength is balanced, at least in part, by adjusting the durations of the first emission time period, the second emission time period and the third emission time period.

17. A method for driving an array of light emitting devices (LEDs) in a color sequential projection display system comprising:

receiving a respective first and second color frame image data;

generating a first and second control signal in accordance with the respective first and second color frame image data;

generating light having a first wavelength from a first LED color channel during a first emission time period in response to the first control signal;

generating light having a second wavelength from a second LED color channel during a second emission time period in response to the second control signal, wherein the light having the first wavelength and the light having the second wavelength is balanced, at least in part, by adjusting durations of the first emission time period and the second emission time period; and propagating the light from the first and second LED color channels to first and second display devices.

18. The method of claim 17, further comprising:

receiving a respective third color frame image data;

generating a third control signal in accordance with the respective third color frame image data;

generating light having a third wavelength from a third LED color channel during a third emission time period in response to the third control signal, wherein the light having the first wavelength and/or the light having the second wavelength and the light having the third wavelength is balanced, at least in part, by adjusting the durations of the first emission time period, the second emission time period and the third emission time period; and propagating the light from the third LED color channel to a third display device.

19. The method of claim 18 wherein the first, second, and third LED color channels emit red, green, and blue light, respectively.

20. The method of claim 18 wherein the first, second, and third LED color channels emit yellow, cyan, and magenta light, respectively.

21. The method of claim 18 wherein the first, second, and third control signals operate on a power supply coupled to the first, second, and third LED color channels to enable the first, second, and third LED color channels, respectively.

22. The method of claim 21, further comprising generating a compensating control signal to operate on the power supply to compensate for a failed LED in at least one of the first, second, and third LED color channels.

23. The method of claim 18 wherein the first, second, and third control signals operate on a first, second, and third switch coupled to the first, second, and third LED color channels to enable the first, second, and third LED color channels, respectively.

24. The method of claim 23, further comprising generating a compensating control signal to operate on at least one of the first, second, and third switches to compensate for a failed LED in at least one of the first, second, and third LED color channels, respectively.

25. The method of claim 18, wherein the first, second, and third LED color channels comprise at least one of a plurality of series parallel array of light emitting diodes.

26. The method of claim 18 wherein the first, second, and third LED color channels comprise at least one of a plurality of series parallel array laser diodes.

27. The method of claim 17, wherein the display device comprises a DMD, LCOS, or LCD.

28. A method for driving an array of light emitting devices (LEDs) in a color sequential projection display system comprising:

receiving a respective first and second color data for driving a respective first and second imaging devices;

generating a first and second control signal in accordance with the respective first and second color data;

generating a first light having a first wavelength from a first LED color channel during a first emission time period in response to the first control signal;

generating a second light having a second wavelength from a second LED color channel during a second emission time period in response to the second control signal, wherein the light having the first wavelength and the light having the second wavelength is balanced, at least in part, by adjusting durations of the first emission time period and the second emission time period; and propagating the first and second lights to the respective first and second imaging devices.

29. The method of claim 28, further comprising:

receiving a third color data for driving a respective third imaging device;

generating a third control signal in accordance with the third color data;

generating a third light having a third wavelength from a third LED color channel during a third emission time period in response to the third control signal, wherein the light having the first wavelength and/or the light having the second wavelength and the light having the third wavelength is balanced, at least in part, by adjusting the durations of the first emission time period, the second emission time period and the third emission time period; and propagating the third light to a respective third imaging device.

30. The method of claim 29 wherein the first, second, and third LED color channels emit red, green, and blue light, respectively.

31. The method of claim 29 wherein the first, second, and third LED color channels emit yellow, cyan, and magenta light, respectively.

32. The method of claim 29 wherein the first, second, and third control signals operate on a first, second, and third current source coupled to the first, second, and third LED color channels to continuously generate the first, second, and third lights, respectively.

33. The method of claim 32 wherein the first, second, and third control signals further operate to adjust a current level of each of the first, second, and third current sources to adjust the brightness of the first, second, and third lights, respectively.

34. The method of claim 32, further comprising generating a compensating control signal to operate on at least one of the first, second, and third current sources to compensate for a failed LED in at least one of the first, second, and third LED color channels, respectively.

35. The method of claim 29, wherein the first, second, and thirds LED color channels are comprised of at least one of a plurality of series parallel array of light emitting diodes.

36. The method of claim 29, wherein the first, second, and third LED color channels are comprised of at least one of a plurality of series parallel array laser diodes.

37. The method of claim 29, wherein the imaging device comprises a DMD, LCOS, or LCD.

* * * * *